(12) United States Patent
Arai

(10) Patent No.: US 7,260,788 B2
(45) Date of Patent: Aug. 21, 2007

(54) LIST DISPLAY DEVICE

(75) Inventor: Masatoshi Arai, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 675 days.

(21) Appl. No.: 10/771,389

(22) Filed: Feb. 5, 2004

(65) Prior Publication Data

US 2004/0155905 A1    Aug. 12, 2004

(30) Foreign Application Priority Data

Feb. 5, 2003    (JP)    ............................. 2003-028763

(51) Int. Cl.
    *G06F 3/048*    (2006.01)
(52) U.S. Cl. .................... 715/834; 715/830; 715/835
(58) Field of Classification Search ................ 715/830, 715/834, 818, 828, 835
    See application file for complete search history.

(56) References Cited

U.S. PATENT DOCUMENTS

| | | | |
|---|---|---|---|
| 5,689,667 A * | 11/1997 | Kurtenbach | 715/810 |
| 5,926,178 A * | 7/1999 | Kurtenbach | 715/834 |
| 6,388,686 B1 * | 5/2002 | Hetherington et al. | 715/810 |
| 2003/0189602 A1 * | 10/2003 | Dalton et al. | 345/830 |
| 2004/0250217 A1 * | 12/2004 | Tojo et al. | 715/810 |
| 2005/0160374 A1 * | 7/2005 | Bailey et al. | 715/830 |
| 2005/0183040 A1 * | 8/2005 | Kondo et al. | 715/841 |

* cited by examiner

*Primary Examiner*—Tadesse Hailu
(74) *Attorney, Agent, or Firm*—Wenderoth, Lind & Ponack, L.L.P.

(57) ABSTRACT

In a list display device, a current item frame being selectively intended at present is arranged in a central zone of a display screen, and precedent item frames and subsequent item frames of the current item frame are separated and arranged in a staircase pattern on right and left sides of the central zone. An item frame immediately before the current item frame and an item frame immediately after the current item frame are arranged in the foreground of the precedent and subsequent item frames. In response to an input operation, the current item frame is moved so as to overlap one of the foreground item frames, and the other foreground item frame is moved to the central zone, such that an item frame, which was adjacent to the other foreground item frame before the other foreground item frame was moved to the central zone, is displayed in the foreground.

5 Claims, 2 Drawing Sheets

F I G. 2
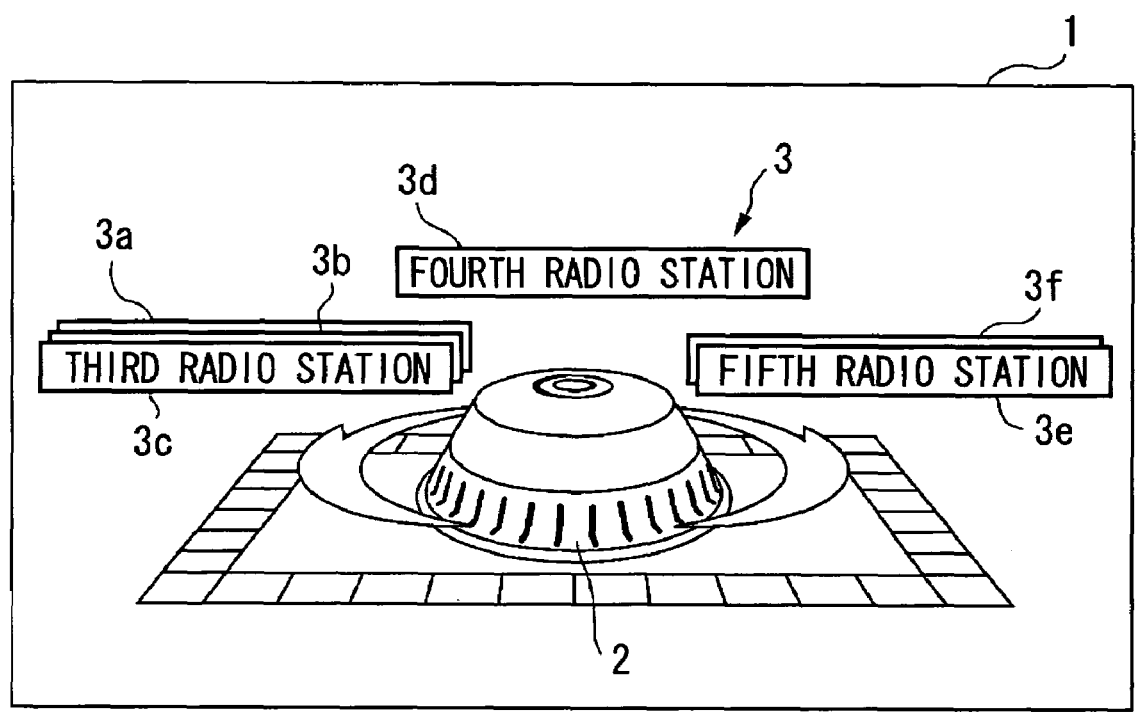

LIST DISPLAY DEVICE

BACKGROUND OF THE INVENTION

1. Field of the Invention

The present invention relates to a list display device, and more particularly, to a list display device suitable for displaying an operation list or the like for equipment such as a navigation system, audio equipment, an air conditioner, or the like, which is mounted on a motor vehicle such as an automobile and so forth.

2. Description of Related Art

Conventionally, such an art is known that allows selection of a desired item from a list, which is displayed on a liquid crystal display screen, for example, an address book of a mobile phone, a destination list of a navigation system, or the like, to display the desired item on the liquid crystal display screen using an operating means such as a jog dial, a joy stick, or the like. Such the prior art is disclosed, for example, in Japanese Patent Laid-Open No. 2002-175139.

In the prior art, there is provided a cubed menu displayed as a virtual image in three dimensions on a menu screen. Displaying menus by rotating circularly, the cubed menu make a user feel as if the user rotates the jog dial, so that the user can visually recognize changes between a plurality of menus on the cubed menu, whereby user-friendliness of the menu is improved.

Meanwhile, in addition to the above prior art, another conventional art is also known as disclosed, for example, in Japanese Patent Laid-Open No. 2002-111839 that displays item names of a list by listing in a vertical or a horizontal direction on a display screen in which such a technique is generally employed that provides indicators on a top side and a bottom side, or a right side and a left side of the list when scrolling the list in the virtual or the horizontal direction.

However, in the former case of the above-mentioned prior art, all of the items are displayed on the display screen, so that when each item has a character or the like assigned, there are many characters to be displayed to thereby cause the user difficulty in viewing item names in the case of a small display screen. In addition, in response to a rotation input operation via a rotation operation element, every item is moved circularly to thereby require an overall update of the display screen at the time of displaying, causing heavy loading on a processing unit of the displaying means. In particular, an entire update of the display screen is not desirable when driving an automobile due to troublesome display.

Also, in the latter case of the above-mentioned prior art, many characters are listed on the display screen, whereby the user loses a point of regard, thus not being suitable for use in the automobile or the like. Specifically, it is impossible to read characters in a moment while driving, so that when there are lots of items all over the display screen, eyeshot runs all over the display screen. As a result, the driver unintentionally reads through characters all over the display screen, so that safety may be impaired while driving the automobile. Besides, due to a small indicator area provided therein, there is another problem of poor visibility.

SUMMARY OF THE INVENTION

The present invention is made in view of the above-mentioned problems. An object of the present invention is to provide a list display device with excellent visibility and operationality, which is suitable for displaying an operation list for equipment provided in a motor vehicle such as an automobile and the like.

The list display device of the present invention includes a display means for displaying a plurality of item frames in sequence on a display screen, each of the item frames indicating an item name of a list; and a display controlling means for moving the plurality of item frames displayed on the display means in response to an input operation into an operation element to thereby display any intended item frame, wherein the display means arranges a current item frame, which is selectively intended at present, in a central zone in the display screen, wherein precedent item frames and subsequent item frames of the current item frame are arranged on a fast side and a second side that are separated byte ventral zone and overlapped with each other in a staircase pattern viewing from a cross direction of the display screen with the item frames immediately before and after the current item frame being in the foreground, and wherein the display controlling means is designed to move the current item frame together with the precedent and subsequent item frames on the first and the second side being overlapped with each other in the staircase pattern in response to an input operation into the operation element.

As a result, in the list display device according to the present invention, what is shown on the display screen are only three item names, they are those indicated in the current item frame and the item frames immediately before and after the same. Consequently, the item names to be displayed are minimized so that the driver can select a desired item without gazing at many characters while driving and so forth.

As for the other item frames, further, only parts of their frames are displayed. With the indicated parts of the item frames, the user is able to easily understand the position of the current item frame and the total volume of the list. In addition, the global image of the list and the current item frame can be displayed in a larger size on the display screen, making it easy to visually recognize them even in the display means using a small liquid crystal display screen or the like. In the case where adapted to the automobile, even when driving the automobile, the driver can ensure a safe driving operation without being distracted by selecting operation of the list. Therefore, with its excellent visibility, the present invention is suitable for use as the list display device for maneuvering on-vehicle equipment while driving.

Preferably, the operation element is a rotation operation element, the current item frame being arranged at a horizontally center position of a circular arc, and the precedent item frames and of the current item frame being arranged on a right side and a left side of the circular arc.

When rotating the rotation operation element so as to move the item frames, what is required to be done on the display screen is only to move the current item frame and the item frames immediately before and alter the same on the circular track. Therefore, operational load on the display control device at the time of regenerating the display screen is reduced as compared to that of the prior art in which every item is displayed circularly and moved in response to the rotation input operation, whereby reloading speed for regenerating the screen can be made faster.

Preferably, the precedent item frames and subsequent item frames are arranged at positions symmetrical to each other with the current item frame intervening therebetween to thereby make the display easy-to-view for the driver.

BRIEF DESCRIPTION OF THE DRAWINGS

The objects, features, and advantages of the present invention will become apparent as the description proceeds when taken in conjunction with the accompanying drawings, in which:

FIG. 2 is a view showing a screen image changed when operating a jog encoder switch of the list display device according to the embodiment in FIG. 1.

DETAILED DESCRIPTION OF THE PREFERRED EMBODIMENT

Figure 1:
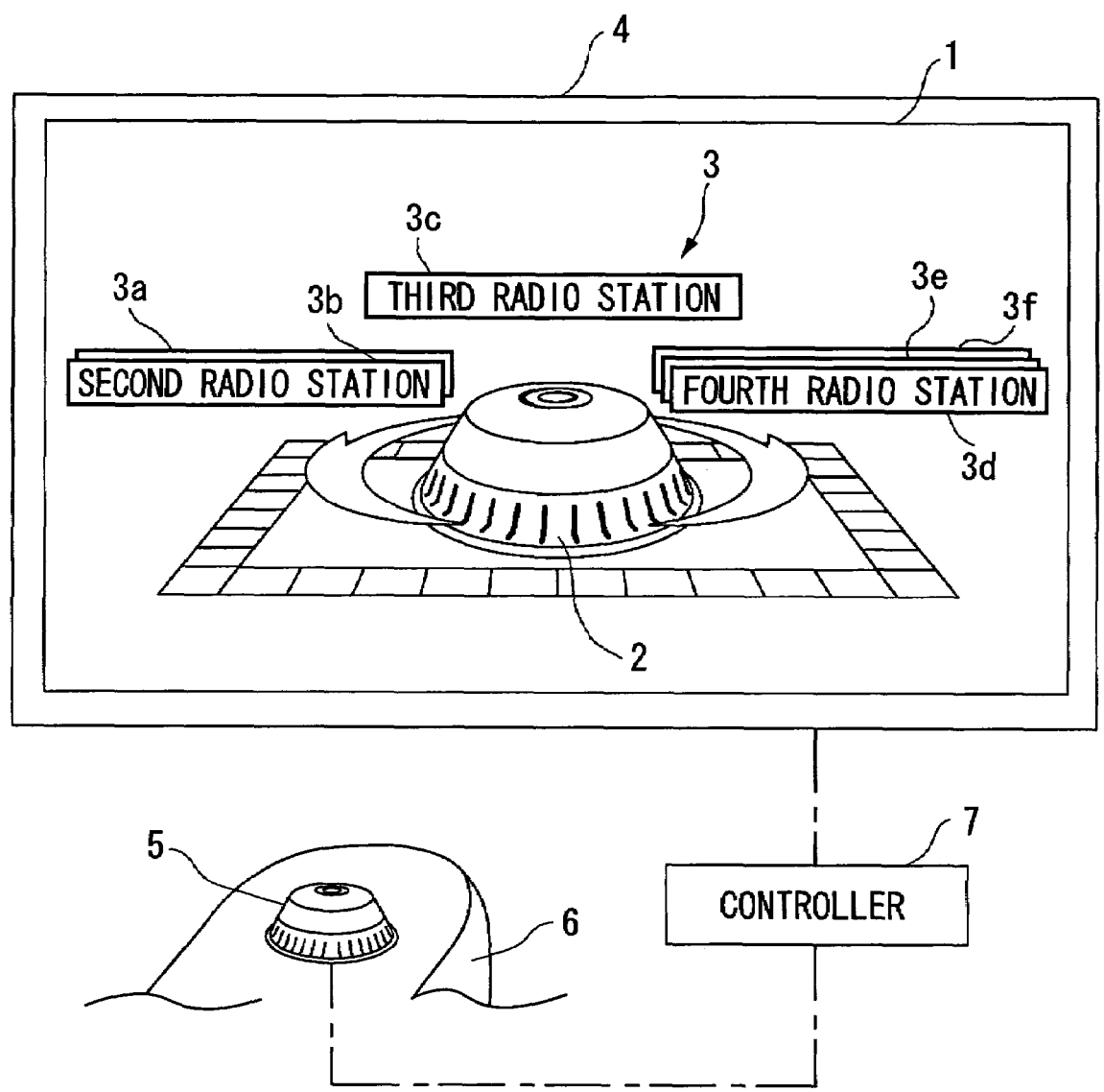
FIG. 1 is a view showing a list display device according to an embodiment of the present invention.

Hereinafter, an embodiment of the present invention will be described based on the drawings.

FIG. 1 is a view showing a list display device according to the embodiment of the present invention.

As shown in FIG. 1, a liquid crystal display 4 is provided in a cluster lid of an instrument panel of an automobile, the liquid crystal display 4 being a device for displaying, on liquid crystal display screen 1 thereof, information about on-vehicle equipment such as an operating state of audio equipment, navigation information, an operating state of an air conditioner and the like, and an operation screen panel and the like for this equipment. In FIG. 1, a list for selecting a radio station is shown. The liquid crystal display 4 functions as a display means of the present invention.

On the lower part of the liquid crystal display screen 1, there is displayed a switch image 2 representing a jog encoder switch 5. The jog encoder switch 5 is provided at a position that is easy to operate for a passenger on a front seat, for example, at a console 6 or the like. Here, the jog encoder switch 5 functions as a rotation operation element of the present invention. The jog encoder switch 5 is connected to a controller 7 which controls an image on the liquid crystal display 4 in response to an input outputted from the jog encoder switch 5. The controller 7 functions as a display controlling means of the present invention. The jog encoder switch 5 functions as a rotation operation element and an operation element of the present invention.

On the upper part of the liquid crystal display screen 1, there are displayed item frames 3 each showing a name of selectable six radio stations from a first radio station to a sixth radio station. Among the item frames 3, an item frame 3c arranged at the center is the item currently selected (hereinafter referred to as "current item frame"). In FIG. 1 of the drawing, a third radio station is currently selected.

Additionally, on the left side and right side of the item frame 3c being the current item frame, an item frame 3b (here, a second radio station being currently selected) being the item frame immediately before the item frame 3c and an item frame 3d (here, a forth radio station being currently selected) being the item frame immediately after the item frame 3c are arranged respectively. These three item frames 3b, 3c, and 3d are arranged on a minor arc set on the display screen. In concrete terms, the item frame 3c being the current item frame is arranged at a horizontally center position of the minor arc, and remaining two item frames are ranged at a left side and a right side of the minor arc respectively in a symmetrical manner.

Further, behind the item frame 3b and the item frame 3d an the screen, an item frame 3a, and item frames 3e and 3f, are arranged respectively in a staircase pattern by overlapping each other, while showing parts thereof on the display screen. Specifically, at the center of the display screen, only the item frame 3c as the current item frame being selectively intended at present is displayed, and on the left side and right side thereof, the item frames 3b and 3d, namely the item frames immediately before and after the item frame 3c are displayed in the foreground with the rest of the item frames partly showing as a piled list. That is, on the side of the item frame 3b, the item frames having even more precedent radio stations are arranged, and on the side of the item frame 3d, the item frames having even more subsequent radio stations are arranged.

Subsequently, the operation of the list display device of the embodiment will be described.

First, the operation of the list display device when selecting the radio station is described.

In FIG. 1, when the jog encoder switch 5 is rotated counterclockwise to the left, the item frame 3d and the item frame 3e move counterclockwise to the left on a track of the minor arc to thereby come to the positions of the current item frame 3c and the item frame in the foreground of the item frames being the piled list on the left side respectively, as shown in FIG. 2, while the item frame 3b is added to the piled list by showing the part thereof. Incidentally, along with the move of the hem frame 3d, on top of the piled list on the right side, the item name indicated in the item frame 3e (fifth radio station) is shown.

Accordingly, in FIG. 2, the item frame 3d takes over the current item frame 3c so that the item name indicated in the item frame 3d (fourth radio station) is selected to tune in to the radio station.

Next, the advantages of the list display device of the embodiment will be described.

In the list display device according to the embodiment of the present invention, the advantages detailed below can be obtained.

In FIG. 1, what is shown on the liquid crystal display screen 1 are only three item names, they are those indicated in the current item frame (3) and the item frames (3b, 3c) immediately before and after the same. Consequently, the item names to be displayed are minimized so that the driver can select a desired item without gazing at many characters while driving and so forth.

As for the item frames 3a, 3e, and 3f which are item frames other than the current item frame 3c and the item frames 3b and 3d being the item frames immediately before and after the current item frame 3c, only parts of their frames are displayed. With the indicated parts of the item frames, the user is able to easily understand the position of the current item frame 3cand the total volume of the list. In addition, the global image of the list and the current item frame 3c can be displayed in a larger size on the display screen, waking it easy to visually recognize them even in the display means using a small liquid crystal display screen 1 or the like. In the case where adapted to the automobile, even when driving the automobile, the driver can ensure a safe driving operation without being distracted by selecting operation of the list. Therefore, with its excellent visibility, the present invention is suitable for use as the list display device for maneuvering on-vehicle equipment while driving.

Moreover, when rotating the jog encoder switch 5 so as to move the item frame 3, what is required to completely regenerate the display screen are only to replace the displayed contents of the current item frame 3c, and the item frame 3b and the item frame 3d being the item frames immediately before and after the current item frame 3c, and to increase or decrease the steps of the item frames of the piled list on the right and left sides which are overlapping each other in the staircase pattern. Therefore, as compared to the prior art, it is possible to lower an operational load on a display controlling device and to quicken the time respectively for regenerating the display screen.

While a preferred embodiment of the present invention has been described, it is to be understood that the particular features of the present invention are not intended to be limited to the embodiment of the present invention, and any change in design and the like may be made therein without departing from the spirit of the invention. Such changes are also included in the scope of the invention.

For instance, the display means may be a CRT display or the like instead of the liquid crystal display 4.

The operation element may be a joy stick or the like instead of the jog encoder switch 5.

In this embodiment, the frames are arranged at the horizontally center position of the circular arc, the right and the left side thereof, but the frames may be located at another positions, for example, on a vertical line or a horizontal line.

In this embodiment, although selection of the radio station for a car radio is shown as one example, the present invention is preferable for an operation panel for on-vehicle equipment such as a navigation system, an air conditioner, or the like.

In addition, the present invention is applicable not only to on-vehicle equipment but also to a telephone number display device for a mobile phone, the operation panel for consumer electronics, and the like.

Further, in this embodiment, the current item frame 3c, and the item frames 3b and 3d being the item frames immediately before and after the same are arranged on the minor arc whereas these item frames may be arranged on the major arc.

Furthermore, the structure of the rotation operation element, the image of the switch, the shape of the item frames, and the like may be established at will.

What is claimed is:

1. A list display device comprising:
   a display means for displaying a plurality of item frames in sequence on a display screen, each of the item frames indicating an item name of a list; and
   a display controlling means for moving the plurality of item frames displayed on said display screen in response to an input operation into an operation element, to thereby display any intended item frame,
   wherein a current item frame, which is selectively intended at present, is arranged in a central zone of the display screen,
   wherein precedent item frames of the current item frame are arranged on a first side of the central zone such that the precedent item frames are overlapped with each other in a staircase pattern,
   wherein subsequent item frames of the current item frame are arranged on a second side of the central zone such that the subsequent item frames are overlapped with each other in a staircase pattern,
   wherein the first side and the second side are separated by the central zone,
   wherein an item frame that is immediately before the current item frame is a foreground item frame of the precedent item frames,
   wherein an item frame that is immediately after the current item frame is a foreground item frame of the subsequent item frames, and
   wherein said display controlling means is operable to, in response to an input operation into the operation element, move the current item frame to either the first side or the second side so as to overlap one of the foreground item frames, and move the other of the foreground item frames to the central zone, such that an item frame, which was adjacent to the other of the foreground item frames before the other of the foreground item frames was moved to the central zone, is displayed in the foreground.

2. The list display device according to claim 1,
   wherein the operation element is a rotation operation element,
   wherein the current item frame is arranged at a horizontally center position of a circular arc and one of the first side and the second side is a right side of the circular arc and the other of the first side and the second side is a left side of the circular arc.

3. The list display device according to claim 2,
   wherein the precedent item frames and the subsequent item frames of the current item frame are displayed at positions symmetrical to each other with the current item frame intervening therebetween.

4. The list display device according to claim 1,
   wherein the precedent item frames and the subsequent item frames of the current item frame are displayed at positions symmetrical to each other with the current item frame intervening therebetween.

5. The list display device according to claim 1,
   wherein the plurality of item frames comprises at least four item frames, and
   wherein only three item names are displayed on the display screen at any given time.

* * * * *